United States Patent [19]
Crowl

[11] 3,822,471
[45] July 9, 1974

[54] PORTABLE SAWING DEVICE

[76] Inventor: Jimmie Ray Crowl, 9011 E. 29 Pl., Tulsa, Okla. 74129

[22] Filed: Oct. 2, 1972

[21] Appl. No.: 294,320

[52] U.S. Cl. ................................................ 30/92
[51] Int. Cl. ......................................... B23d 21/06
[58] Field of Search ............ 7/1 F, 1 P, 13 R, 13 B; 30/90.2, 92, 124, 148, 166, 371, 372, 373, 374, 378, 392, 393, 394; 83/743, 745, 753, 755, 759, 761, 773, 774; 145/31 R, 31 D, 33 D, 108 R

[56] References Cited
UNITED STATES PATENTS
224,968   2/1880   Swinehart ........................... 83/773
2,271,398   1/1942   Ochoa ................................ 83/755

Primary Examiner—James L. Jones, Jr.
Assistant Examiner—Mark S. Bicks

[57] ABSTRACT

A portable sawing device including a frame integral with a handle, the said frame having saw guiding means and means suitable for mounting objects to be cut, the said handle being pivotally connected to one end of the said frame; a removable saw blade being mounted on the said handle, a spring mounted on the said handle for holding the said saw blade against the object to be cut.

4 Claims, 2 Drawing Figures

PATENTED JUL 9 1974                                              3,822,471

PORTABLE SAWING DEVICE

This invention relates to hand tools, and more particularly to a portable sawing device.

It is therefore the primary purpose of this invention to provide a portable sawing device which will utilize a normal hack-saw blade so as to provide an improved method of cutting particularly in restricted areas.

Another object of this invention is to provide a saw of the type described, which will produce a straight and smooth cut.

Another object of this invention is to provide a saw of the type described, which will have a frame member to which is attached a pivotable handle, the handle having bolting means for engagement with the hack-saw blade carried thereon.

A further object of this invention is to provide a saw of the type described which will have clamp means carried upon the base member for clampingly engaging different sized objects to be cut.

Other objects of the present invention are to provide a saw device which will be simple in design, inexpensive to manufacture, rugged in construction, easy to use and efficient in operation.

These and other objects will be readily evident upon the study of the following specification and the accompanying drawing wherein.

SUMMARY OF THE INVENTION

Figure 1:
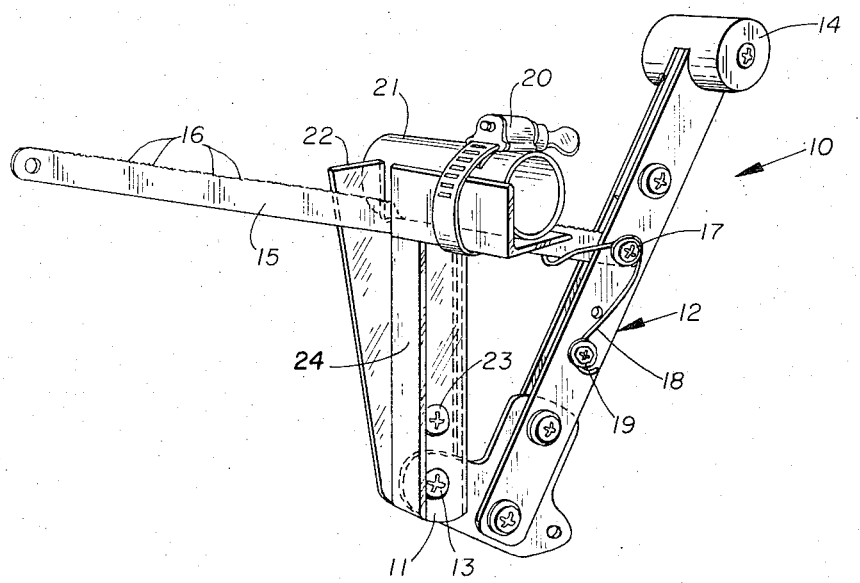
FIG. 1 is a plan view of the present invention.
Figure 2:
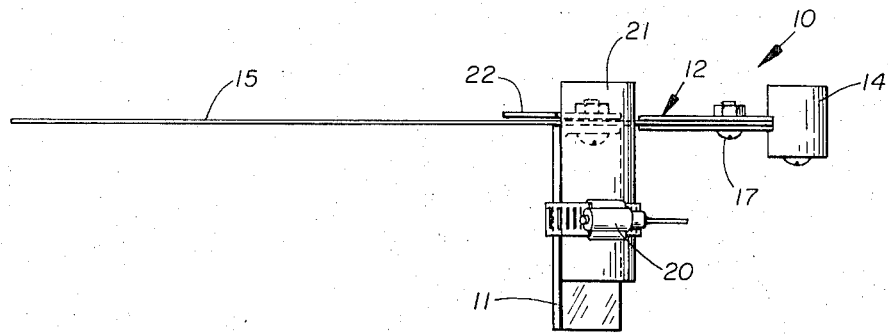
FIG. 2 is a bottom end view of FIG. 1.

According to this invention, a portable saw 10 is shown to include a frame 11 of L-shaped cross sectional configuration to which is pivotably secured a handle portion 12 by means of screw fastener 13. The opposite end of handle portion 12 includes a pair of oppositely opposed hand grips 14 for the operation of saw 10. A hack-saw blade 15 having a plurality of teeth 16 is secured at one end to handle portion 12 by means of a screw fastener 17 and a spring 18 is pivotally carried upon screw 17 and one end of spring 18 engages the non-toothed side of blade 15 and the opposite end of spring 18 is secured upon projecting pin 19, the spring action of spring 18 serving to keep the blade 15 firmly against the object being cut. An adjustable clamp member 20 is carried by the frame 11 of saw 10 and serves to rigidly hold tube 21 or other object being cut, within the base 11.

In use, the tube 21 or other object, is received within the clamp member 20 of the frame 11 and is tightened therein so that the operator may engage the teeth 16 of blade 15 thereon, the spring 18 serving to constantly apply pressure to the blade 15 when the handle 12 is moved pivotally backwards and forwards towards with respect to the base 11.

Reference is made to FIG. 1 which shows a flat member 22 attached is spaced relationship to frame 11. Flat member 22 projecting in a forwardly direction is bolted to Frame 11 at 13 and 23. Flat member 22, Frame 11 and handle 17 are bolted together to form unitary structure with handle 17 positioned so as to have a back and forth movement around pivot point 13 at the end of frame 11. Flat member 22 attached to frame 11 provides a guide for cutting blade 15. Cutting blade 15 is held in tension by spring means 18 so as to move cutting blade 15 in an upward movement against the object 21. This provides for the cutting blade 15 to move freely into space upon completion of the cutting cycle. The clamp 20 and a second channel member 24 provides means for holding the pipe to be cut. This device can accurately cut pipe in place in close quarters which heretofore has been impossible with other known devices. The clamp 20 consists of an adjustable metallic band mounted around the second channel member 24 in which the pipe to be cut is placed. The metallic band can be sized by moving the band through a holder having a worm gear therein. The metallic band can be adjustably moved clockwise or counter clockwise by manually turning the worm gear until the desired opening is obtained.

I claim:

1. A single unit portable sawing device comprising:
   a. A first channel shaped frame member with a flat member attached in parallel spaced relationship to the said frame member;
   b. A handle member pivotly attached to one end of the said frame member;
   c. A saw blade pivotly mounted off center on the said handle;
   d. The said saw blade being spring loaded and passing between the said first frame member and the said flat member;

2. The portable sawing device as claimed in claim 1 wherein the said first channel frame member has a second channel member positioned approximately perpendicular to at least one surface of the said channel member to provide supporting means for objects to be sawed.

3. The portable sawing device as claimed in claim 2 wherein handle grips are attached to the end of the said handle.

4. The portable sawing device as claimed in claim 3 wherein clamping means is provided around the said second channel member.

* * * * *